US012782232B2

(12) United States Patent
Hofbauer

(10) Patent No.: US 12,782,232 B2
(45) Date of Patent: Nov. 3, 2026

(54) METHOD FOR MEASURING OPTICAL LENS SURFACES

(71) Applicant: Engelbert Hofbauer, Munich (DE)

(72) Inventor: Engelbert Hofbauer, Munich (DE)

(73) Assignee: ENGELBERT HOFBAUER, Munich (DE)

( * ) Notice: Subject to any disclaimer, the term of this patent is extended or adjusted under 35 U.S.C. 154(b) by 98 days.

(21) Appl. No.: 18/841,753

(22) PCT Filed: Feb. 28, 2022

(86) PCT No.: PCT/EP2022/054947

§ 371 (c)(1),
(2) Date: Aug. 27, 2024

(87) PCT Pub. No.: WO2023/160815

PCT Pub. Date: Aug. 31, 2023

(65) Prior Publication Data

US 2025/0180429 A1 Jun. 5, 2025

(51) Int. Cl.
*G01M 11/02* (2006.01)

(52) U.S. Cl.
CPC ................................ *G01M 11/0221* (2013.01)

(58) Field of Classification Search
CPC ................................................ G01M 11/0221
See application file for complete search history.

(56) References Cited

U.S. PATENT DOCUMENTS

2006/0164530 A1* 7/2006 Frey, Jr. ................. H04N 25/57 348/E3.018
2008/0304080 A1* 12/2008 Ueki .................. G01M 11/0221 356/127
2012/0033228 A1 2/2012 Tschudi et al.
2012/0133951 A1* 5/2012 Heinisch ............ G01B 9/02025 356/498
2013/0027692 A1 1/2013 Ogura et al.
2024/0385074 A1* 11/2024 Sato ....................... G01M 11/00

FOREIGN PATENT DOCUMENTS

EP 1636542 B1 9/2007
EP 3037800 B1 4/2018
EP 3961180 A1 3/2022

OTHER PUBLICATIONS

International Search Report and Written Opinion mailed on Oct. 19, 2022, received for PCT Application No. PCT/EP2022/054947, filed on Feb. 28, 2022, 13 pages including English Translation.

* cited by examiner

*Primary Examiner* — Michael A Lyons
(74) *Attorney, Agent, or Firm* — XSENSUS LLP

(57) ABSTRACT

In a method for measuring optical lens surfaces, a measuring beam is generated by an extended light source, collimated via an optical arrangement, and detected using an optical detector after reflection on a lens surface to be measured. An aperture delimiting the measuring beam is inserted between the light source and the optical detector and acts as a vignetting field stop. The field stop is imaged onto the optical detector out of focus as a first light spot by the measuring beam after reflection on a first lens surface. The optical detector simultaneously also detects at least a second light spot obtained by reflection of the measuring beam on a second lens surface. An angle of each lens surface with respect to the optical axis of the measuring beam can be simultaneously determined for both lens surfaces from the intensity distribution of the two light spots.

11 Claims, 5 Drawing Sheets

METHOD FOR MEASURING OPTICAL LENS SURFACES

CROSS-REFERENCE TO RELATED APPLICATION

The present application is a national stage application, pursuant to 35 U.S.C. § 371, of International Patent Application No. PCT/EP2022/054947, filed Feb. 28, 2022, the entire contents of which are incorporated herein by reference.

TECHNICAL AREA OF APPLICATION

The present invention relates to a method for measuring optical lens surfaces, in particular for the centring measurement on aspherical lenses, wherein the lens surfaces are measured in reflection with a measuring arrangement, in which an aperture delimiting the optical measuring beam is inserted and imaged out of focus as a light spot on an optical detector of the measuring arrangement.

In the production of aspherical lenses, deviations from the desired aspherical shape can occur due to production errors or production tolerances, which have to be detected for reasons of quality assurance. This can take place with a contactless centring measurement, by means of which a vertex offset or an axis tilt of the aspherical lens can be detected. In the centring measurement, the position of the centre of curvature (vertex) of the spherical portion of the aspherical lens surface is first determined and is then measured on the aspherical portion, i.e. the edge region outside the vertex.

PRIOR ART

EP 1918687 B1 describes the method for determining the position of a symmetrical axis of an aspherical lens surface relative to a reference axis, wherein the position of the centre of curvature of the spherical of the lens surface is first determined and then a wobbling motion of the aspherical portion is measured by rotating the lens about an axis of rotation in order to determine the position of the axis of symmetry of the aspherical lens surface relative to the axis of rotation. The measurements take place with autocollimators via a reflection on the lens surface to be measured.

A method and a measuring device for the contactless measurement of angles or changes in angles on objects is known from EP 1636542 B1, which can also be used among other things for the measurement of aspherical lens surfaces or mirror lens surfaces. In this method, an extended light source is used to generate an optical measuring beam, which is used to pass light through a stop acting as a field stop and which is detected by an optical detector after reflection on the surface to be measured. The stop through which light is passed is imaged onto an optical detector out of focus as a light spot via an optical system. By determining the position of the stop image in relation to a reference position, an angle between the measured surface and an optical axis of the measuring beam at the point of intersection of the optical axis with the measured surface can be determined.

A method for measuring optical lens arrangements based on back-reflections from different lens surfaces is known from EP 3037800 B1, wherein relatively complex imaging optics are used to generate different image planes at assumed positions of the centres of curvature of the lens surfaces.

WO 2014/114444 A1 discloses a method for measuring optical lenses with the aid of an autocollimating telescope, wherein individual lens surfaces are measured successively each by focusing on the corresponding lens surface. A further method for measuring optical lens surfaces is known from U.S. Pat. No. 7,286,212 B2, wherein separate imaging optics are used for each lens surface. Each lens surface is in each case measured only from the side to which it is directed.

The problem of the present invention consists in specifying a method for measuring optical lens surfaces of an optical lens arrangement, which enables a rapid measurement of at least two lens surfaces of the optical lens arrangement without complex imaging optics.

DESCRIPTION OF THE INVENTION

The problem is solved with the method according to the claims. Advantageous developments of the method are the subject-matter of the dependent claims or can be deduced from the following description and the examples of embodiment.

In the proposed method, an optical measuring beam is generated with an extended light source, collimated via an optical arrangement, directed onto a first lens surface of an optical lens arrangement that is to be measured and detected using at least one spatially resolving optical detector after reflection on the first lens surface to be measured. In this method, an aperture delimiting the measuring beam is inserted between the light source and the optical detector, which aperture acts as a vignetting field stop and is imaged out of focus by the measuring beam onto the optical detector as a light spot, hereinafter referred to as the first light spot due to the reflection on the first lens surface to be measured, and detected by the optical detector.

The extended light source is formed such that it generates a uniform extensive luminance, for example by using one or more LEDs with a diffusing screen arranged in front of them or with a condenser arranged in front of them or also a combination of diffusing screen and condenser arranged in front of them. The spatially resolving optical detector can for example be constituted by a CCD or CMOS area sensor. Of course, other spatially resolving optical detectors can also be used. Several spatially resolving detectors arranged next to one another are also possible.

The aperture delimiting the optical measuring beam is preferably formed by a stop with a fixed or adjustable stop opening. It can also be formed by a suitable lens mount of a lens in the optical arrangement. It is arranged at a suitable point in the beam path of the measuring beam in order to achieve the vignetting effect for generating the light spot out of focus on the detector, preferably in or between the optical arrangement for collimation, preferably autocollimating optics, and the optical lens arrangement with the lens surfaces to be measured. The optical lens arrangement can be a single lens, for example a single- or double-sided asphere, i.e. an aspherical lens with an aspherical and a spherical or with two aspherical lens surfaces, or also an arrangement of several lenses spaced apart from one another.

In the proposed method, at the same time as the first light spot is detected, the optical detector also detects at least a second light spot, which is obtained by reflection of the measuring beam on another lens surface, referred to in the following as the second lens surface, of the optical lens arrangement. This light spot also arises due to the effect of the aperture delimiting the measuring beam as a vignetting field stop and the imaging of this aperture—after reflection on the second lens surface—on the optical detector. The intensity distributions of the two light spots detected simultaneously by the optical detector are then evaluated in order to determine the respective angle between the first lens surface and the optical axis of the measuring beam at the point of intersection of the optical axis of the measuring beam with the first lens surface and between the second lens surface and the optical axis of the measuring beam at the point of intersection of the optical axis of the measuring beam with the second lens surface. This determination of the angle can be carried out in the same way as is described, for example, in the aforementioned EP 1636542 B1. The respective angle at the measuring position (point of intersection between the optical axis of the measuring beam and the lens surface) can be determined from a shift of the respective light spot relative to a known reference position (zero position) on the optical detector. The vignetting effect of the aperture delimiting the measuring beam enables a very precise determination of the position of the light spot by the intensity distribution generated by the light spot, which has a V-shape along a line passing through the centre of the light spot.

In the proposed method, it was recognised that, when using a measuring arrangement with the vignetting field stop, a light spot generated by a further, second lens surface, which the measuring beam strikes after passing through the first lens surface, can also be detected together with the first light spot on the detector and evaluated accordingly. The second lens surface can, for example, be the rear lens surface of a lens or also—in the case of cemented lenses—an inner lens surface. The two light spots on the detector must be sufficiently distinguishable or separable from one another to determine the angles. If this is not the case during a measurement, the lens arrangement or lens is shifted perpendicular to the optical axis of the measuring beam until the two light spots are sufficiently distinguishable or separable. The distance of the shift is appropriately recorded and taken into account in the evaluation. The proposed method thus allows at least two lens surfaces to be measured simultaneously with regard to their angle to the optical axis of the measuring beam at the respective measuring position without an additional or complex optical arrangement. In the case of the measurement of an asphere, the exact position of the asphere, in particular a tilt or a lateral offset, can thus be determined by a measurement on the aspherical portion with a single rotation measurement of at least 180°—or correspondingly a number of measurements at different positions in one half of the asphere.

BRIEF DESCRIPTION OF THE DRAWINGS

The proposed method is explained again below in greater detail with the aid of examples of embodiment in combination with the drawings. Here.

WAYS OF PERFORMING THE METHOD

In the proposed method, at least two partially reflecting lens surfaces, which can be constituted spherical or also aspherical, are each used to image blurred exit apertures onto a detector as images of the delimiting aperture or aperture stop of the optically active system used in the method. In order to ensure this kind of effect of the aperture stop as a field stop, it is positioned at a suitable position in the beam path of the measuring beam. The emitted measuring or object beam bundle is not stationary as for example in the case of classic autocollimators with crosshairs. Rather, the object used is an extended light source (object luminous surface), which should preferably have at least the same dimensions or the same size as the detection area of the detector, so that each object luminous point corresponds to a corresponding conjugated image point position which, through the centre of the aperture stop, corresponds to a corresponding main beam inclination a. This angle of the main beam is determined and evaluated during the detection. The object luminous surface is particularly preferably selected larger than the detection area. Due to the inherent out-of-focus image of the exit pupil of the entire system on the detector, longitudinally different out-of-focus exit apertures can be evaluated on the detector from different lens surfaces (usually with different radii). The only important thing here is that the beams have different (separable) surface tilt angles at the lens surfaces. More than two surfaces can then be detected. To optimise the measurement, it is advantageous to adjust the beam divergence using suitable auxiliary lenses or also by suitably adjusting the optical arrangement, usually an objective, in such a way that the light spots are sufficiently separated from one another on the detector. The light spots are therefore adjusted using the optical elements, and if necessary, also by adjusting the stop size, so that the two light spots cannot overlap, but rather can be separated from one another.

Figure 1:
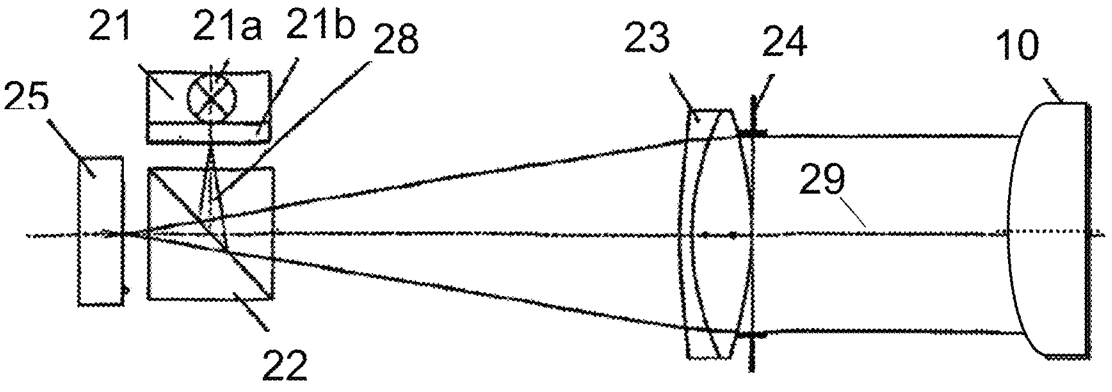
FIG. 1 shows a diagrammatic representation of an exemplary optical setup, such as can be used in performing the proposed method.

FIG. 1 first shows a diagrammatic exemplary setup of the measuring system, such as can be used in the proposed method. The figure shows an extended light source 21, also referred to in the present patent application as an area radiator, which in this example is formed by irradiating a diffusing screen **21*b* from a radiation source 21*a*, for example an LED. Measuring beam bundle 28 issuing from this extended light source 21 is irradiated into the optical system via a beam splitter 22, deflected by 90° and passed through aperture stop 24. The beam bundle is reflected at lens 10 to be measured and, after passing through beam splitter 22 again, is imaged onto photosensitive detector 25 via objective 23. A reflection occurs not only at the lens surface of lens 10 facing the measuring system, but also at the lens surface facing away from the measuring system. If the lens surfaces at the intersection with optical axis 29 of this measuring system are not exactly at an angle of 90° to this axis, a light spot is imaged on detector 25 for each of the lens surfaces, which deviates from the intersection of optical axis 29 with detector 25. The light spot arises due to the vignetting effect of aperture stop 24** and enables an exact measurement of the angular deviation from the 90° angle, as is described in greater detail in EP 1636542 B1 for example.

Figure 2:
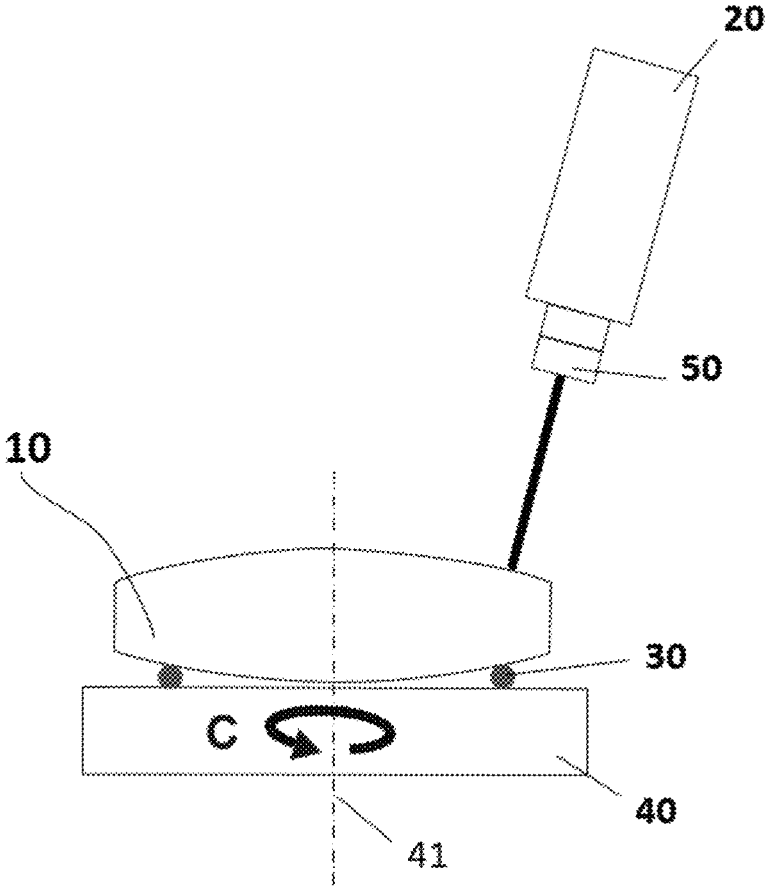
FIG. 2 shows an example of the use of this optical setup in the measurement of an asphere with the proposed method.

FIG. 2 shows a diagrammatic representation of the measurement of a lens 10, in this case a spherical lens, using the measuring arrangement of FIG. 1, which is also referred to as sensor 20 in this and the following examples. In these examples, an auxiliary lens 50 for beam shaping is arranged in front of this sensor 20. For the measurement, lens 10 to be measured is preferably placed on a lens mount 30, for example a ring edge or three-point support, on a turntable 40 which can be rotated about an axis of rotation 41 (rotation C). Lens mount 30 also enables precise referencing of sensor 20 to the lens to be measured, for example by placing a polished sphere of known precision on lens mount 30 and adjusting the arrangement of this ball. A reference axis can thus be determined using sensor 20 or also a similar, suitable instrument, and the lens support can be referenced as the reference surface of the lens to be measured.

Figure 3:
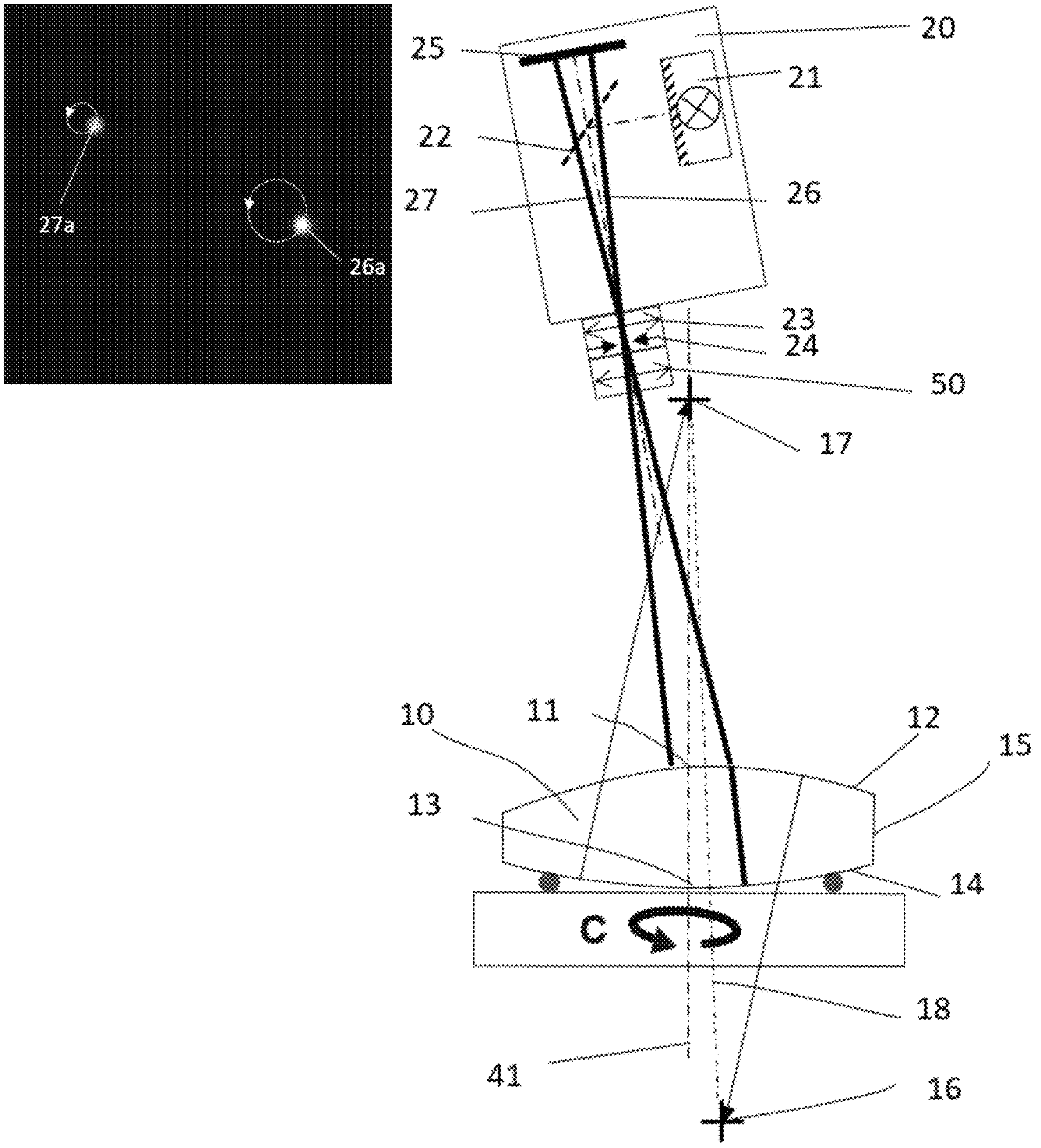
FIG. 3 shows a further example for performing the proposed method with such a setup.

FIG. 3 shows a more detailed representation of the measurement of a spherical lens 10 with sensor 20 according to the proposed method. In this illustration, extended light source 21, detector 25, beam splitter 22 as well as objective 23 and aperture stop 24 are represented diagrammatically in sensor 20. Auxiliary lens 50 can also be seen in this representation. Spherical lens 10 to be measured rests on lens mount 30 on the turntable. Spherical lens 10 has a vertex 11, an edge region 12, a rear vertex 13, a rear edge region 14 and an edge cylinder 15. In the present example, it is indicated that centre of curvature 16 of the front lens surface and centre of curvature 17 of the rear lens surface lie on optical axis 18 of the lens, which does not however coincide with axis of rotation 41 of the turntable. FIG. 3 shows two main beams 26, 27 which, after reflection at the two lens surfaces, appear as out-of-focus light spots on detector 25 due to vignetting by aperture stop 24. Vignetting main beam 26, which is reflected on the front lens surface, leads to a light spot 26*a*, and vignetting main beam 27, which is reflected on the rear lens surface, leads to an out-of-focus light spot 27*a* on the detector. The upper left-hand part of FIG. 3 shows an example of the field of view or the detection area of detector 25 with the two light spots 26*a*, 27*b* with a clear lateral separation, so that both can be recorded and evaluated simultaneously. In this way, the inclination of the lens surface at the point of intersection of the optical axis of the measuring beam with the respective lens surface can be determined. When the turntable rotates, the two light spots each describe a circular or elliptical shape with a corresponding diameter, which corresponds to the real (front side, surface 1) or virtual (rear side, surface 2) surface tilt angle. The circular shape is indicated in the upper left-hand part of FIG. 3 in the field of view of detector 25. The meridional and sagittal beam paths can be evaluated separately. The real surface tilt angle of the rear side can be calculated backwards via the measured optical effect of the first (front) surface (radius, refractive index, thickness) by means of an optical design program. The angular deviations can also be interpreted as a lateral offset of the respective meridional and sagittal centres of curvature with respect to the axis of rotation.

In non-paraxial measurements where the measuring beam strikes the first lens surface at an angle of incidence ε (angle to the vertical=incidence perpendicular), non-linear deviations in the refraction of the beam at the first lens surface are noticeable, which have to be taken into account when calculating the surface tilt angle of the second lens surface, as the case may be. In the centring measurement of the individual real surface tilts, the calculation of rear surface tilt angles is always influenced by the surface inclinations of the lens surfaces that are in front of them and is calculated exactly by calculating the beam path backwards. For non-linear changes in the case of non-paraxial application of the beam path, this leads to errors which already lead to 5% deviations with an angle of incidence of 15°. With larger angles of incidence of 35 to 45 degrees, the error can be in the range from 200 to 300 percent.

The approximate consideration and creation of the relationships are intended to be made here in an idealisation of the application:

1. Lens or asphere axis=axis of rotation
2. Reflecting (second) surface close behind the first surface
3. Reflected beam at the same point as the incident beam The change in angle ε' of the refracted beam is obtained via refractive index n and angle of incidence ε itself as:

$$d\varepsilon' = n\frac{\cos\varepsilon\varepsilon}{\cos\varepsilon\prime}d\varepsilon$$

A correction factor K=n*cosε/cosε' is thus obtained, which is used to determine the real surface tilt angle of the second surface. This correction factor can be provided, for example, via an LUT (look-up table) as a function of the angle of incidence.

Figure 4:
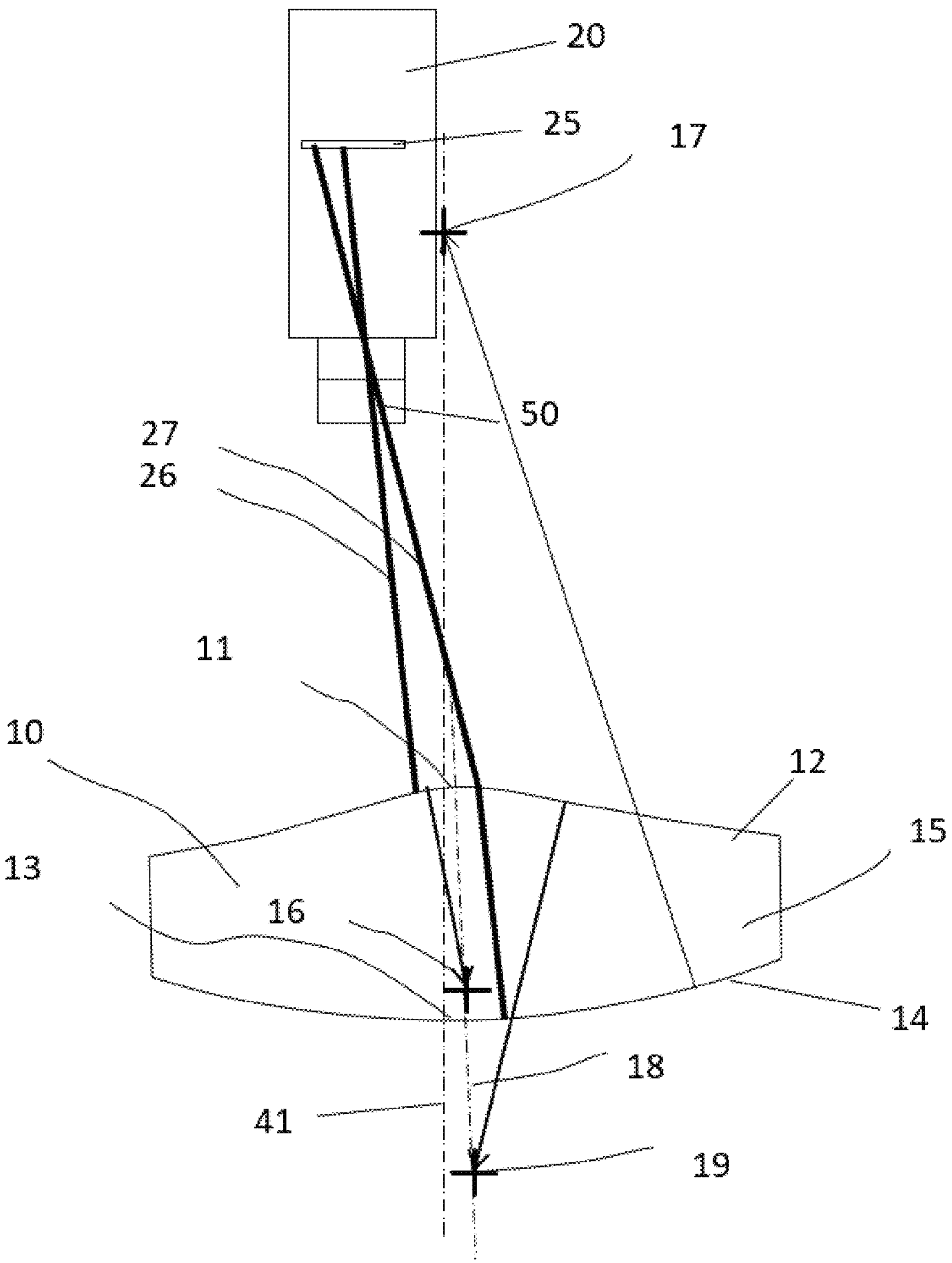
FIG. 4 shows an example for the measurement of an asphere with the proposed method.
Figure 5:
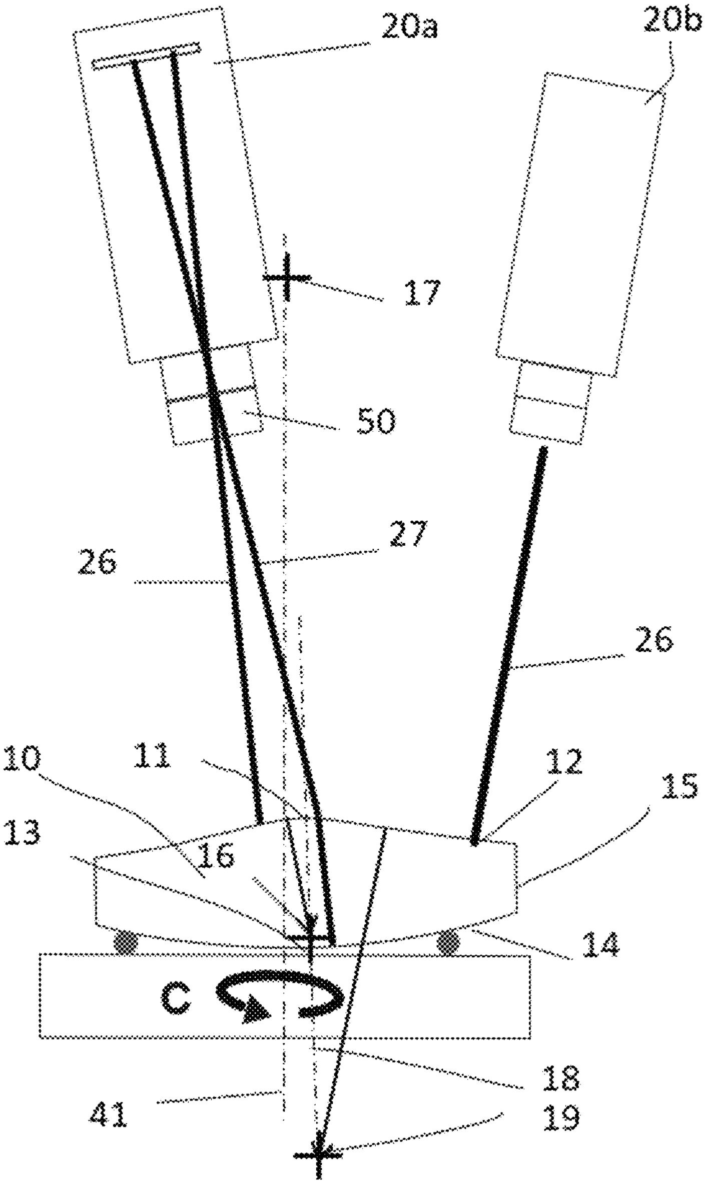
FIG. 5 shows a further example for the measurement of an asphere with the proposed method; and FIG. *6a/b* show examples for the measurement of a double-sided asphere with the proposed method.

When measuring aspheres, the method is used in the same way as shown in FIG. 4 using the example of measuring a one-sided asphere. An aspherical surface has not just one, but many centres of curvature, all of which lie on an axis which runs through the vertex (point of rotational symmetry). An aspherical surface has an aspherical axis. This axis can be inclined towards a reference axis and the vertex or point of rotational symmetry of the surface can be shifted laterally from the reference axis. In this regard, FIG. 4 shows the example of a one-sided asphere 10 (one side asphere, other side sphere) with vertex 11 or the central region of the front surface of the asphere and edge region 12 of the front surface of the asphere. Sensor 20 is only shown in a simplified form in this figure with detector 25 and auxiliary lens 50. The two measuring beams reflected at the front and rear side of asphere 10, vignetted main beam 26 and vignetted main beam 27, are also represented by way of example. Asphere 10 has an apparent centre of curvature 19 at the edge and a centre of curvature 16 of the vertex. Aspherical axis 18 is also shown in the figure. Here, too, the reflection of the measuring beam at the two lens surfaces of the asphere results in two light spots on detector 25, by means of which the two lens surfaces can be measured both in the central region and at the edge. This is again shown in FIG. 5 with the same reference numerals using an example, in which two sensors 20*a* and 20*b* are used in order to be able to carry out measurements simultaneously in the centre of asphere 10 and in the edge region of asphere 10.

Figure 6A:
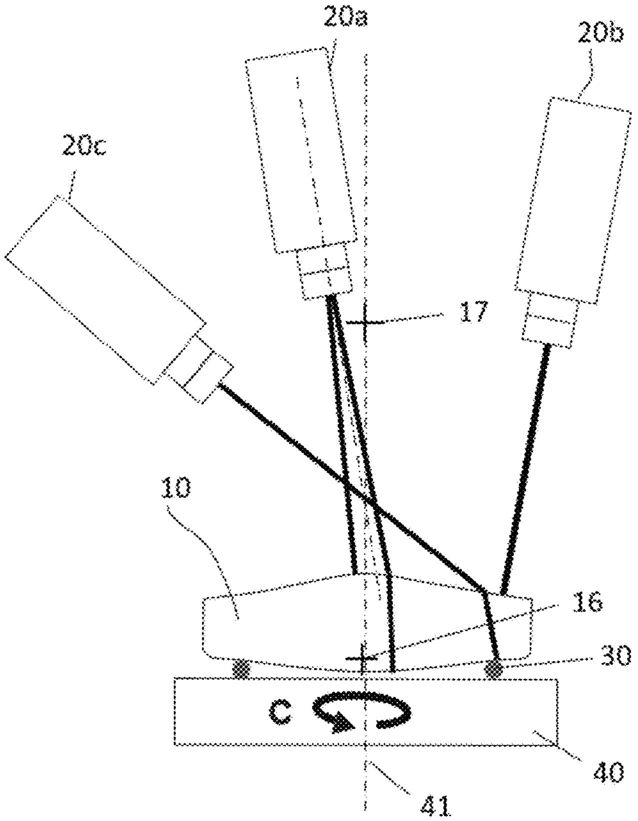
Figure 6B:
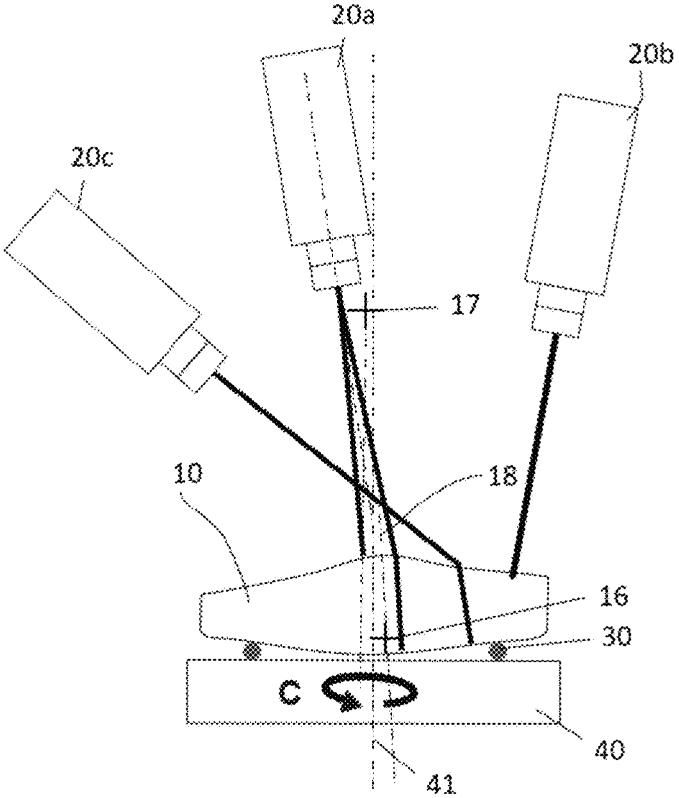

In the case of double-sided aspheres (rear side also with an aspherical surface), the aspherical axis can no longer be determined sufficiently accurately with just one measurement in the centre. Here, measurement is required at different points, as is shown diagrammatically with the aid of FIGS. 6*a* and 6*b* with an additional measurement of the rear surface at the edge using third sensor 20*c*. The two measurements at the front and rear surface at the edge are also preferably carried out simultaneously according to the proposed method with just one sensor, for example sensor 20*b*.

The determination of the inner centring error of an aspherical lens can take place for example with the following steps:

a) Referencing of the support (or lens mount 30) as the reference surface of the lens, for example with the aid of a sphere of a preferred, approximately averaged radius of the two lens surfaces with sensor 20 or a similar, suitable instrument, which can measure the centres of curvature of the lens surfaces without changing auxiliary lenses, moving the instrument along the optical axis or varying the focus;

b) Measuring the position of the centre of curvature of the spherical portion of the aspherical lens surfaces to be measured;

c) Measuring the aspherical portion outside the vertex (for both lens surfaces simultaneously);

d) Determining the inherent, inner centring error by calculation from the two measured values with the aid of the known design data (such as radius, thickness and refractive index).

The structure of the optical arrangement for measuring the lens surfaces can also deviate from the example of FIG. 1, for example by exchanging the detector and light source, by using a different beam splitter, by arranging the vignetting field stop at a different point or by other modifications, as long as the vignetting effect of the field or aperture stop for producing the out-of-focus light spots on the detector is guaranteed.

LIST OF REFERENCE NUMBERS

10 Lens
11 Vertex or central region of the lens front surface
12 Edge region of the lens front surface
13 Vertex or central region of the lens rear surface
14 Edge region of the lens rear surface
15 Edge cylinder of the lens
16 Centre of curvature of the first surface
17 Centre of curvature of the second surface
18 Optical axis of the lens
19 Apparent centre of curvature of the asphere at the edge
20 Sensor
20*a* First sensor
20*b* Second sensor
20*c* Third sensor
21 Extended light source
21*a* Radiation source
21*b* Diffusing screen
22 Beam splitter
23 Objective
24 Aperture stop
25 Photosensitive detector
26 Vignetting main beam after reflection at the front lens surface
26*a* Vignetting main beam after reflection at the front lens surface
27 Vignetting main beam after reflection at the rear lens surface
27*a* Light spot on the detector
28 Measuring beam bundle
29 Optical axis
30 Lens mount
40 Turntable
41 Axis of rotation
50 Auxiliary lens

The invention claimed is:

1. A method for measuring optical lens surfaces of an optical lens arrangement, comprising:

collimating an extended light source via a collimating optical arrangement to generate an optical measuring beam;

directing the optical measuring beam onto a first lens surface of the optical lens arrangement;

detecting the optical measuring beam using at least one spatially resolving optical detector after reflection on the first lens surface of the optical lens arrangement;

inserting an aperture to delimit the optical measuring beam between the extended light source and the optical detector, the aperture acting as a vignetting field stop and is being imaged out of focus by the optical measuring beam onto the optical detector as a light spot and being detected by the optical detector;

determining an angle between the first lens surface and an optical axis of the optical measuring beam at a point of intersection of the optical axis of the measuring beam with the first lens surface from an intensity distribution of a first light spot on the optical detector and a shift of the first light spot in relation to a reference position;

detecting by the optical detector, at a same time as the first light spot is detected, at least a second light spot, which is obtained by reflection of the measuring beam on a second lens surface of the optical lens arrangement; and determining an angle between the second lens surface and the optical axis of the optical measuring beam at the point of intersection of the optical axis of the measuring beam with the second lens surface from an intensity distribution of the second light spot on the optical detector and a shift of the second light spot in relation to the reference position.

2. The method according to claim 1, further comprising:

shifting the optical lens arrangement perpendicular to the optical axis until the light spots are sufficiently distinguishable in a case that the first and second light spot are not sufficiently distinguishable on the detector to determine the angles.

3. The method according to claim 1, wherein:

the aperture delimiting the measuring beam includes a stop with a fixed or adjustable stop opening.

4. The method according to claim 1, wherein:

the optical arrangement includes an autocollimating optics.

5. The method according to claim 1, wherein:

the extended light source includes a luminous surface having at least a size of a detection area of the optical detector.

6. The method according to claim 1, wherein:

the optical lens arrangement includes an aspherical lens having an aspherical first lens surface with a central spherical portion and an adjoining aspherical portion the method further comprising:

determining a position of a centre of curvature of the central spherical portion of the aspherical first lens surface; and measuring, at one or more positions of the aspherical portion, an angle between the aspherical first lens surface and the optical axis of the measuring beam and at the same time an angle between a second lens surface of the aspherical lens and the optical axis of the measuring beam.

7. The method according to claim 1, further comprising:

placing the optical lens arrangement on a turntable; and rotating the optical lens arrangement, using the turntable, about an axis of rotation in order to determine the angles between lens surfaces and the optical axis of the measuring beam at several positions on a circle line or a section of a circle line around the axis of rotation.

8. The method according to claim 7, further comprising:

rotating the optical lens arrangement by at least 180° about the axis of rotation.

9. A method for measuring optical lens surfaces of an optical lens arrangement using a plurality of sensors each including an extended light source, a collimating optical arrangement, an aperture, and a spatially resolving optical detector, the method comprising:

collimating each of the extended light sources via the corresponding collimating optical arrangement to generate an optical measuring beam from each of the plurality of sensors;

directing each of the generated optical measuring beams onto a different location of a first lens surface of the optical lens arrangement;

detecting the optical measuring beam using the spatially resolving optical detector in each of the plurality of sensors after reflection on the first lens surface of the optical lens arrangement;

inserting each aperture to delimit the optical measuring beam between a corresponding extended light source and a corresponding optical detector, the detector acting as a vignetting field stop and being imaged out of focus by the corresponding optical measuring beam onto the corresponding optical detector as a light spot;

determining angles between the first lens surface and corresponding optical axes of the respective optical measuring beams from an intensity distribution of a first light spot on the corresponding optical detector and a shift of the first light spot in relation to a reference position;

detecting by each optical detector, at a same time as the first light spot is detected, at least a second light spot, which is obtained by reflection of the corresponding optical measuring beam on a second lens surface of the optical lens arrangement; and determining angles between the second lens surface and the optical axis of each of the optical measuring beams at respective points of intersection of the optical axes of the measuring beams with the second lens surface from an intensity distribution of the second light spot on the corresponding optical detector and a shift of the second light spot in relation to the reference position.

10. The method according to claim 9, further comprising:

using one of the plurality of sensors to determine angles at a position in a region of a vertex of the first lens surface; and using at least one other sensor in the plurality of sensors to determine angles at one or more positions in an edge region of the first lens surface.

11. The method according to claim 1, further comprising:

determining, in the case where an incidence of the optical measuring beam on the first lens surface is not perpendicular, the angle between the second lens surface and the optical axis of the optical measuring beam at a point of intersection of the optical axis of the optical measuring beam with the second lens surface using a correction factor K, which takes account of a refraction of the optical measuring beam at the first lens surface.

* * * * *